Dec. 15, 1931.  C. H. KRAUSE  1,836,976
DIAPHRAGM FOR FLUSH VALVES
Filed Oct. 20, 1928
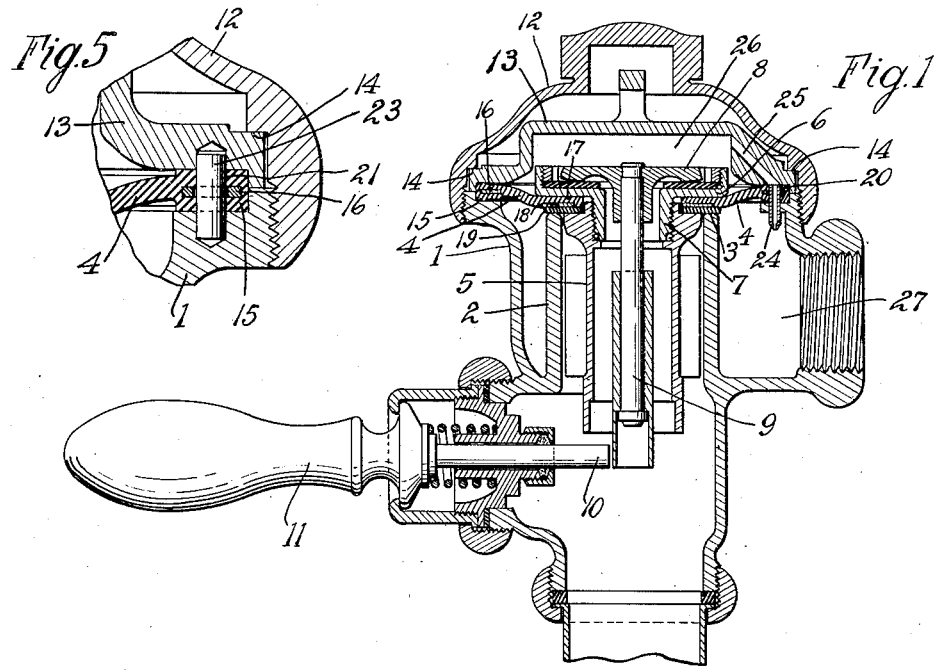
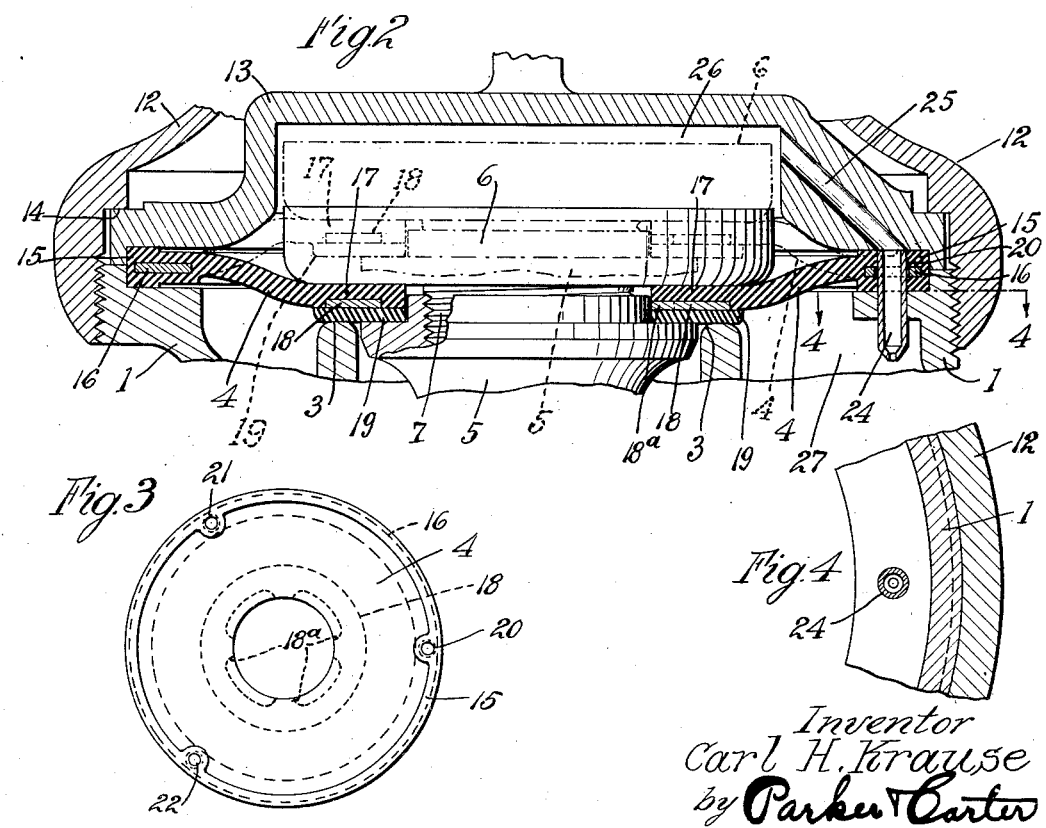
Inventor
Carl H. Krause
by Parker Carter
Attorneys.

Patented Dec. 15, 1931

1,836,976

UNITED STATES PATENT OFFICE

CARL H. KRAUSE, OF CHICAGO, ILLINOIS, ASSIGNOR TO SLOAN VALVE COMPANY, OF CHICAGO, ILLINOIS, A CORPORATION OF ILLINOIS

DIAPHRAGM FOR FLUSH VALVES

Application filed October 20, 1928. Serial No. 313,664.

This invention relates to diaphragms for flush valves and has for its object to provide a new and improved device of this description.

The diaphragm in a flush valve serves certain purposes. It forms a partition between the two valve chambers. The outer rim further serves as a gasket between the body and the inside cover and the inner portion, which is shown as thickened, serves as a gasket between the parts with which it is connected. The diaphragm also furnishes a yielding surface for the main valve seat when the main valve is closed.

One of the objects of the present invention is to provide a device with the foregoing characteristics and which shall also avoid small particles of dirt which may gather on the seat or the diaphragm from preventing a proper and complete closure of the main valve.

The invention has a further object to provide a diaphragm which will prevent noise during the closing of the valve.

The invention has other objects which are more particularly pointed out in the accompanying description.

Referring now to the drawings, Fig. 1 is a view in section showing a flush valve with the diaphragm in position.

Fig. 2 is an enlarged view of a portion of the flush valve showing the diaphragm in full lines when the valve is in its closed position and in dotted lines when the valve is in its open position.

Fig. 3 is a top view of the diaphragm.

Fig. 4 is a sectional view taken on line 4—4 of Fig. 2.

Fig. 5 is a sectional view taken through one edge of the diaphragm showing one of the dowel pins.

Like numerals refer to like parts throughout the several figures.

Referring now to the drawings, I have shown a flush valve consisting of a casing 1 provided with the interior cylindrical part 2, the upper edge 3 of which forms the valve seat. The main valve consists of the diaphragm 4 which seats on the seat 3 and which is connected with the guiding device 5 fitting into the cylindrical part 2. The diaphragm is provided with the central opening and a disc 6 has a portion 7 which projects through the center opening and is screw threaded to the guide 5, the diaphragm being clamped between the disc and the guide. An auxiliary valve 8 is mounted on the disc 6 and has a stem 9 which projects through the opening in the diaphragm, the end being arranged opposite the actuating part 10 which is pushed inwardly by the handle 11 and tilts the valve to open it. The casing has an external cover 12 and an internal cover 13. The external cover is screw threaded to the casing and has a shoulder 14 which engages the internal cover and presses it downwardly from the edge of the diaphragm. The diaphragm 4 is provided with a thickened outer edge 15 and an internal member 16 embedded therein. The diaphragm is also provided with a thickened central portion 17 with an internal member 18 embedded therein. The metal member 18 is provided with centering projections 18a which fit closely upon the guide 5 and coincide accurately with the center of the rim so that the guide will be guided accurately in the body and give free and easy operation.

The diaphragm proper is made preferably of rubber so as to be flexible between the edge 15 and the central portion 17 so that the valve may be easily opened. Since the valve is opened by the pressure of the water, and since the valve is sometimes operated on systems where the pressure is low, it is necessary to have the portion of the diaphragm between the edge 15 and the center 17 of great flexibility so as not to oppose too much resistance to the opening of the valve and this is secured by making it of flexible material which bends easily. As the valve approaches its closed position, the rush of water inwardly between the two closing surfaces, that is, the lower part of the diaphragm and the seat 3, is extremely rapid and the yielding part, that is, the diaphragm portion, when the ordinary diaphragm is used, may be deformed by being pulled inwardly. This action takes place suddenly near the end of the closing motion and produces a knock or noise which is objectionable. With this ordinary diaphragm, the soft, yielding seat often causes a rattle. This is due to the fact that very close to the end of the stroke, some condition makes the valve drop upon the seat quickly and it rebounds due to the excessive elasticity of the ordinary diaphragm and this action continues and may become a powerful vibration producing a loud, objectionable noise.

I have found that by making the closing surface on the diaphragm of a material less flexible and elastic than the main body of the diaphragm, all these troubles are avoided. In the present device, the seating section 19 of the diaphragm is made of firm, more or less inelastic rubber vulcanized to the soft, pliable rubber of the remaining portion of the diaphragm and this is done at the time the diaphragm is moulded about the metal rings 16 and 18. This gives a highly flexible central portion for the diaphragm and a seating portion which is of still sufficient elasticity to prevent particles from holding the valve open but which will not stretch until the flow of the water will produce the knock above referred to and which will also not rebound so as to cause the vibrating rattle hereinbefore described. The diaphragm is provided with three openings, 20, 21 and 22, unequally spaced. Two of these openings fit over dowel pins 23 in the body and cap as shown in Fig. 5 and the third opening fits over the by-pass tube 24 as shown in Fig. 1.

This by-pass tube connects with the passageway 25 leading to the chamber 26 above the diaphragm connecting therewith, the chamber 27 located below the diaphragm.

I claim:—

1. A diaphragm comprising a thickened central portion having an opening therethrough, a flexible section between the outer edge and the thickened central portion made of flexible elastic material and a non-metallic seating portion forming part of the central portion, said seating portion being made of different material of less elasticity than the central portion.

2. A diaphragm comprising a thickened central portion having an opening therethrough, a flexible section between the outer edge and the thickened central portion made of flexible elastic material and a non-metallic seating portion forming part of the central portion, said seating portion being made of different material of less elasticity than the central portion and two metal rings, one embedded in the edge of the diaphragm and the other in the thickened central portion.

3. A diaphragm comprising a thickened central portion having an opening therethrough, a flexible section between the outer edge and the thickened central portion made of flexible elastic material, a seating portion forming part of the central portion, said seating portion being made of different material of less elasticity than the central portion and two metal rings, one embedded in the edge of the diaphragm and the other in the thickened central portion, the metal ring in the central portion being provided with a series of guiding projections.

4. A diaphragm comprising a thickened central portion having an opening therethrough, said thickened central portion adapted to engage a seat, a thickened peripheral portion and a flexible section connecting the peripheral portion and the central portion, and means associated with the thickened central portion at the seat engaging portion thereof for preventing the diaphragm from vibrating when it is moved to its seating position.

5. A diaphragm comprising a central portion having an opening therethrough, a thickened peripheral portion, a flexible section between the central portion and the peripheral portion, the peripheral portion, central portion and flexible section between them being integral and of the same material, a non-metallic seating section of less elasticity connected with the central portion and adapted to engage the seat with which the diaphragm is used.

Signed at Chicago, county of Cook and State of Illinois, this third day of October, 1928.

CARL H. KRAUSE.